Feb. 19, 1935.  L. CHEVROLET  1,991,657
PITMAN ROD CONNECTION FOR RADIAL CYLINDER ENGINES
Filed May 16, 1932
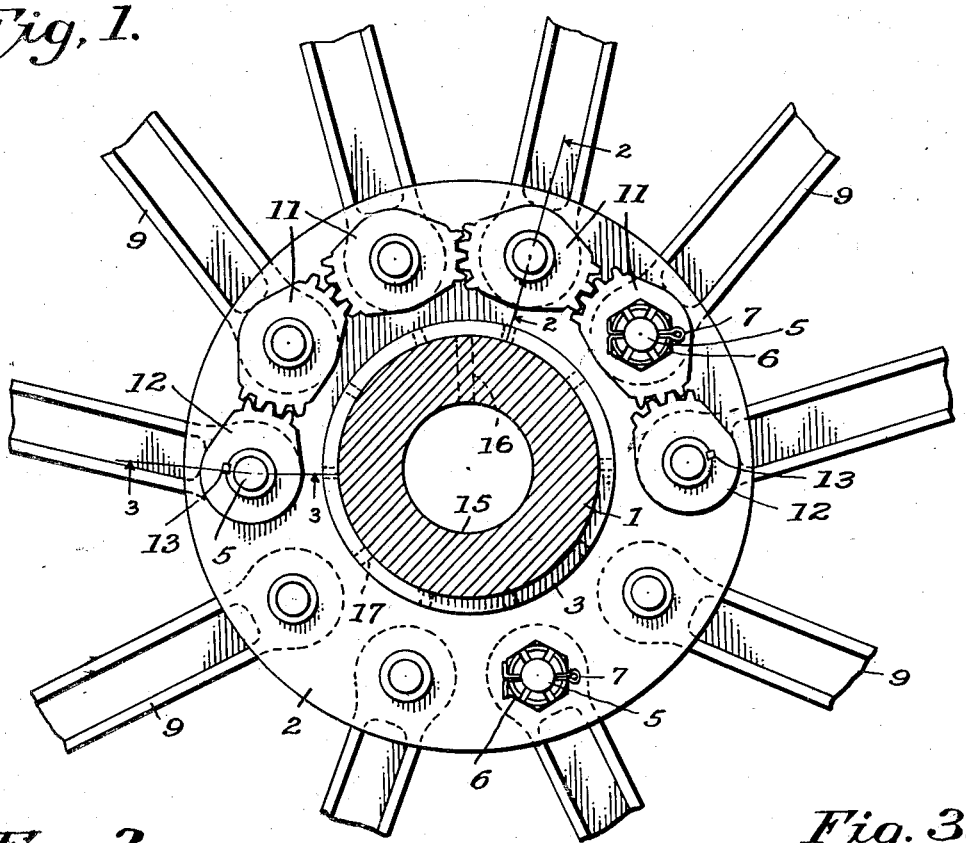
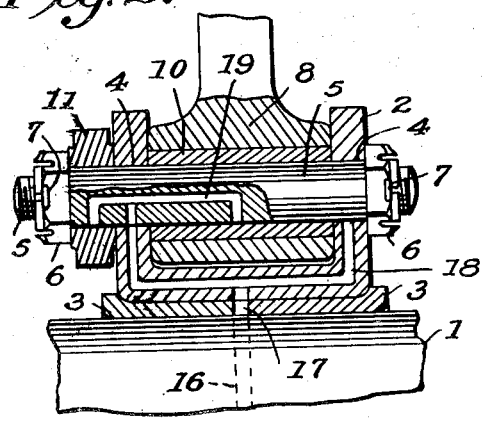
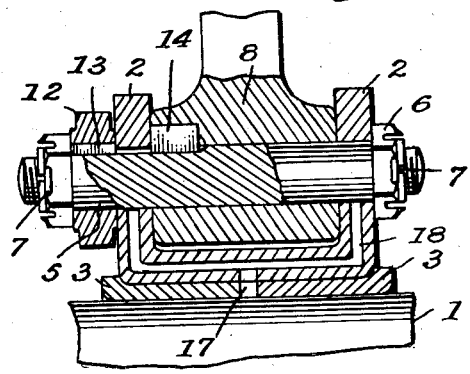
Inventor
Louis Chevrolet.
By Milans & Milans.
Attorney Patented Feb. 19, 1935

1,991,657

UNITED STATES PATENT OFFICE 1,991,657

PITMAN ROD CONNECTION FOR RADIAL CYLINDER ENGINES

Louis Chevrolet, Baltimore, Md.

Application May 16, 1932, Serial No. 611,693

10 Claims. (Cl. 121—120)

This invention relates to certain new and useful improvements in pitman rod connections for radial cylinder engines.

Extreme difficulty has been encountered in making pitman rod connections in this type of engine owing to the fact that the angular or articulated positions of the several pitmans must be uniform throughout the operations of the engine. In an attempt to accomplish this, there are illustrations in the prior art suggesting the use of a master pitman rod which encircles the crank of the engine shaft and to this encircling section of the master pitman the auxiliary pitmans are pivotally attached. In such cases, however, the firing point in the several cylinders does not coincide and, therefore, is not evenly timed, nor is the stroke and angularity of the several pitmans balanced and uniform. It has also been found that the piston which is connected to the master pitman is subjected to all of the side-thrusts resulting from the explosion or working strokes of all of the other cylinders. Further, in making these so-called master pitmans, expert and necessarily expensive machining operations must be made in providing the bearing openings in which the auxiliary pitmans are mounted.

It is, therefore, the basic object of the present invention to provide a structure wherein all of the pitman rods are of a like construction and connected to the crank shaft of the engine at points concentric to the crank shaft so that all the pitmans will have a uniform angularity of movement or articulation.

Another object of the invention is the provision of a construction wherein the firing point of the several cylinders may be evenly timed which results in a more balanced and smooth action in the operation of the engine.

A still further object of the present invention resides in the coordination of the movements of two of the pitman rods which results in the perfect angularity or articulation of the entire series of connected pitmans, with an even distribution of the side-thrusts from the working strokes of all of the cylinders to a plurality of pistons instead of one.

Other objects and aims of the invention will more readily present themselves to those skilled in this art when the following specification is read in connection with the attached drawing wherein I have illustrated in a general way the application of my principle. It will, of course, be fully understood that certain changes and variations may be resorted to without sacrificing any of the spirit of the present invention. The scope of protection sought will appear in the appended claims.

In the drawing, like parts are indicated by similar letters of reference wherein—

Fig. 1 is a side elevation of the improved pitman rod connection to the crank shaft of an engine, said crank shaft being shown in section;

Fig. 2 is a cross-sectional view taken on line 2—2 of Fig. 1; and

Fig. 3 is also a cross-sectional view taken on line 3—3 of Fig. 1.

Referring more in detail to the attached drawing, 1 indicates the crank portion of an engine shaft and to which it is desirous to attach the inner ends of the several pitman rods. Mounted on the crank 1 is a channel shaped ring 2 within the bore of which is secured a split bushing 3—3. The upstanding walls of the channel ring 2 are provided with a plurality of equally spaced and circularly arranged apertures 4, the apertures 4 in one wall being aligned with those of the opposite wall to receive the cross bolts or knuckle pins 5. These pins 5 are securely retained in their proper position by any suitable and anchoring means and in the drawing the suggested use of a threaded nut 6 with a locking key or cotter 7 is merely illustrative of one form of anchoring means.

The inner end 8 of each pitman 9 snugly fits within the channel ring 2 and is pivotally mounted on one of the cross bolts or knuckle pins 5. Any suitable form of bearing or sleeve 10 may be used at the pivotal point of the connections of the pitmans 9 to the cross bolt or knuckle pins 5.

Several of the knuckle pins 5 are of a sufficient length to permit the assemblage of gear sectors thereon and to better illustrate this, attention is directed to Figs. 2 and 3. In Fig. 2 the gear sectors 11 are capable of free pivotal motion on the ends of the pins 5 while in Fig. 3 the gear 12 is keyed as at 13 to the knuckle pin 5 so as to oscillate therewith. Also in Fig. 3 it will be noted that the inner end of the pitman 9 is keyed as at 14 to the knuckle pin 5 so as to transmit the oscillatory or turning movements of the pitman 9 to the pin 5.

As is clearly shown in Fig. 1, several of the sector gears 11 are so arranged as to intermesh and thereby transmit the movement which is implied thereto by either of the gears 12 which are at the terminal ends of the train of gears. In this figure there is shown a ten cylinder construction with the gearing arranged between six of the pitmans, four being merely idlers and the end ones being keyed to the knuckle pins for positive motion therewith. It will be clearly understood that the number of cylinders herein shown is merely illustrative and should not be construed in a limiting sense as this general principle can be employed in radial engine constructions regardless of the number of cylinders just so long as the gear train is associated with the two opposite pitmans employed and has the proper number of gears to reverse the motion.

In order that the moving parts may be suitably lubricated, oil under pressure is housed within the crank shaft reservoir 15 which is provided with an outlet duct 16. The bushing 3—3 has a series of transverse passages 17 which are in registry with the branched ducts 18 leading to the bearing point or points of the knuckle pins 5 in the ring member 2. Furthermore as shown in Fig. 2 the knuckle pin may be provided with a channel or duct 19 to properly distribute the lubricant to the bushing member 10 and the pivotally supported gear 11. The oil being under pressure in the reservoir 15 will be forced through the outlet duct 16 and into the passages 17 in the bushing when the duct 16 is brought into successive registry with the several passages 17 and a sufficient amount of lubricant will be supplied at the various needed points by the branched ducts 18 and 19.

In assembling the construction shown in the attached drawing the channel ring 2 is first mounted on the crank shaft of the engine. Then the inner ends 8 of the several pitmans 9 are pivotally associated with said ring by the knuckle pins 5. The gear segments 11 are then arranged on the pins so as to intermesh through their full range of movement and the end gears 12 are keyed to their respective pins 5. The ring 2 is, therefore, effectively locked against any relative shifting or turning movement on the crank shaft so that all of the pitmans are set so as to have their proper angular movements with reference to the crank shaft.

What I claim is:

1. A pitman rod assemblage for radial engines, comprising a crank shaft, a ring mounted thereon, knuckle pins carried by the ring, pitman rods mounted on the pins, two of said pitman rods being keyed to their knuckle pins, and means for transmitting the pivotal movements of one of said keyed pins to the other keyed pin.

2. A pitman rod assemblage for radial engines, comprising a crank shaft, a ring mounted thereon, knuckle pins carried by the ring, pitman rods mounted on the pins, two of the pitmans oppositely disposed being keyed to their knuckle pins and means for transmitting the pivotal movements of one of said keyed pins to the other keyed pin.

3. A pitman rod assemblage for radial engines, comprising a crank shaft, a ring mounted thereon, knuckle pins carried by the ring, pitman rods mounted on the pins, two of said pitman rods being keyed to their knuckle pins, and a positively actuating means for transmitting the pivotal movements of one of said keyed pins to the other keyed pin.

4. A pitman rod assemblage for radial engines, comprising a crank shaft, a ring mounted thereon, knuckle pins carried by the ring, pitman rods mounted on the pins, two of said pitman rods being keyed to their knuckle pins, a gear affixed to each of said keyed knuckle pins and a series of intermeshed gear segments for transmitting the pivotal movements of one of said keyed pins to the other keyed pin.

5. A pitman rod assemblage for radial engines, comprising a crank shaft, a ring mounted thereon, knuckle pins carried by the ring, pitman rods mounted on the pins, two of said pitman rods being keyed to their knuckle pins, a gear affixed to each of said keyed knuckle pins and a series of intermeshed gear segments pivotally supported on the intermediate knuckle pins for transmitting the pivotal movements of one of said keyed pins to the other keyed pin.

6. A pitman rod assemblage for radial engines, comprising a crank shaft, a ring mounted thereon, knuckle pins carried by the ring, pitman rods mounted on the pins, two of said pitman rods being keyed to their knuckle pins, and an intermeshing gear train associated with the majority of the knuckle pins with the end gears affixed to said keyed knuckle pins.

7. A pitman rod assemblage for radial engines, comprising a crank shaft, a ring mounted thereon, knuckle pins carried by the ring, pitman rods mounted on the pins, two of said pitman rods being keyed to their knuckle pins, and means for coordinating the angular movements of said two pitmans.

8. A pitman rod assemblage for radial engines, comprising a crank shaft, a channel shaped ring member mounted thereon, knuckle pins carried by the ring member, a series of pitman rods having their inner ends positioned within the channel and secured to said knuckle pins, and means for transmitting the pivotal motion of one knuckle pin to an opposing knuckle pin.

9. A pitman rod assemblage for radial engines, comprising a crank shaft, a ring mounted thereon, knuckle pins carried by the ring, pitman rods mounted on the pins, a plurality of said pitman rods being keyed to their knuckle pins, and interconnecting means between the keyed knuckle pins for coordinating their pivotal movements.

10. A pitman rod assemblage for radial engines, comprising a crank shaft, a ring mounted thereon, a series of pitman rods each having at its inner end a knuckle pin for pivotal attachment to said ring, a plurality of said pitman rods being keyed to their knuckle pins, and interconnecting means between the keyed knuckle pins for coordinating their pivotal movements

LOUIS CHEVROLET.